United States Patent
Wieczorek et al.

(10) Patent No.: US 12,440,440 B2
(45) Date of Patent: Oct. 14, 2025

(54) DRY POWDER ESKETAMINE COMPOSITION FOR USE IN THE TREATMENT OF BIPOLAR DEPRESSION BY PULMONARY ADMINISTRATION

(71) Applicant: Novohale Therapeutics, LLC, San Diego, CA (US)

(72) Inventors: Maciej Wieczorek, Kielpin (PL); Ewa Tratkiewicz, Warsaw (PL); Przemyslaw Perko, Warsaw (PL)

(73) Assignee: Novohale Therapeutics, LLC, San Diego, CA (US)

( * ) Notice: Subject to any disclaimer, the term of this patent is extended or adjusted under 35 U.S.C. 154(b) by 0 days.

(21) Appl. No.: 18/965,257

(22) Filed: Dec. 2, 2024

(65) Prior Publication Data

US 2025/0090457 A1 Mar. 20, 2025

Related U.S. Application Data

(63) Continuation of application No. 16/958,965, filed as application No. PCT/EP2018/076394 on Sep. 28, 2018, now abandoned.

(30) Foreign Application Priority Data

Dec. 29, 2017 (EP) .................................... 17461651

(51) Int. Cl.
*A61K 9/00* (2006.01)
*A61K 31/135* (2006.01)
*A61P 25/24* (2006.01)

(52) U.S. Cl.
CPC .......... *A61K 9/0075* (2013.01); *A61K 31/135* (2013.01)

(58) Field of Classification Search
CPC ...... A61K 9/0075; A61K 31/135; A61P 25/24
See application file for complete search history.

(56) References Cited

U.S. PATENT DOCUMENTS

| | | |
|---|---|---|
| 7,973,043 B2 | 7/2011 | Migaly |
| 8,263,125 B2 | 9/2012 | Vaya et al. |
| 8,268,352 B2 | 9/2012 | Vaya et al. |
| 9,073,819 B2 | 7/2015 | Amin et al. |
| 9,895,077 B2 | 2/2018 | Shahaf et al. |

(Continued)

FOREIGN PATENT DOCUMENTS

| | | |
|---|---|---|
| CA | 2213567 A1 | 8/1996 |
| CN | 106562952 A | 4/2017 |

(Continued)

OTHER PUBLICATIONS

Alberich et al., Efficacy and safety of ketamine in bipolar depression: A systematic review, Elsevier, Rev Psiquiatr Salud Ment, 2017; 10(2):104-112. (Year: 2017).*

(Continued)

*Primary Examiner* — Mina Haghighatian
(74) *Attorney, Agent, or Firm* — Foley Hoag LLP; Lucas P. Watkins; Jyoti R. Tibrewala

(57) ABSTRACT

A dry powder inhalable pharmaceutical composition comprising ketamine or its pharmaceutically acceptable salt for use in a method of treatment of depression by administration via pulmonary route. The composition is especially useful for the treatment of treatment-resistant or treatment-refractory depression.

11 Claims, 10 Drawing Sheets

(56) References Cited

U.S. PATENT DOCUMENTS

| | | |
|---|---|---|
| 10,596,378 B2 | 3/2020 | Rustick |
| 10,716,950 B2 | 7/2020 | Best |
| 10,857,097 B2 | 12/2020 | Lim et al. |
| 10,905,897 B2 | 2/2021 | Morries et al. |
| 10,991,449 B2 | 4/2021 | Niculescu |
| 11,103,467 B2 | 8/2021 | Manthei et al. |
| 11,110,070 B2 | 9/2021 | Brachman et al. |
| 11,154,537 B2 | 10/2021 | Clifton et al. |
| 11,207,316 B2 | 12/2021 | Pollard et al. |
| 11,213,495 B2 | 1/2022 | Chen |
| 11,331,270 B2 | 5/2022 | Temtsin-Krayz |
| 11,554,100 B2 | 1/2023 | Nivorozhkin et al. |
| 11,555,007 B2 | 1/2023 | Kandula |
| 11,559,484 B2 | 1/2023 | Kakumanu et al. |
| 11,793,794 B2 | 10/2023 | Abdallah et al. |
| 11,883,526 B2 | 1/2024 | Singh et al. |
| 11,925,607 B2 | 3/2024 | Wieczorek et al. |
| 11,957,688 B2 | 4/2024 | Lichenstein et al. |
| 2005/0038062 A1 | 2/2005 | Burns et al. |
| 2005/0148673 A1 | 7/2005 | Harbut et al. |
| 2006/0121488 A1 | 6/2006 | Rothstein |
| 2007/0287753 A1 | 12/2007 | Charney et al. |
| 2008/0096872 A1 | 4/2008 | Friedman |
| 2008/0132531 A1 | 6/2008 | Holtman et al. |
| 2008/0234257 A1 | 9/2008 | Gant et al. |
| 2008/0280886 A1 | 11/2008 | Gant et al. |
| 2009/0004281 A1 | 1/2009 | Nghiem et al. |
| 2009/0028824 A1 | 1/2009 | Chiang et al. |
| 2009/0082388 A1 | 3/2009 | Hacksell et al. |
| 2009/0111837 A1 | 4/2009 | Cox et al. |
| 2009/0170897 A1 | 7/2009 | Corradini et al. |
| 2009/0198145 A1 | 8/2009 | Chow |
| 2009/0220429 A1 | 9/2009 | Johnsen et al. |
| 2009/0306137 A1 | 12/2009 | Wolfgang et al. |
| 2010/0029665 A1 | 2/2010 | Meyerson et al. |
| 2010/0074955 A1 | 3/2010 | Buschmann et al. |
| 2010/0297181 A1 | 11/2010 | Hanada et al. |
| 2010/0311697 A1 | 12/2010 | Went et al. |
| 2010/0316678 A1 | 12/2010 | Goodchild |
| 2012/0225949 A1 | 9/2012 | Papalos |
| 2013/0236573 A1 | 9/2013 | Singh et al. |
| 2014/0037718 A1 | 2/2014 | Lutz |
| 2014/0079740 A1 | 3/2014 | Salama |
| 2014/0093592 A1 | 4/2014 | Singh et al. |
| 2014/0154203 A1 | 6/2014 | Castillo et al. |
| 2014/0275277 A1 | 9/2014 | Basstanie et al. |
| 2014/0275278 A1 | 9/2014 | Basstanie et al. |
| 2015/0050350 A1 | 2/2015 | Staniforth et al. |
| 2015/0057317 A1 | 2/2015 | Mccarthy et al. |
| 2015/0073330 A1 | 3/2015 | Shantha |
| 2015/0328159 A1 | 11/2015 | Whitfield et al. |
| 2015/0329497 A1 | 11/2015 | Pinkerton et al. |
| 2015/0374712 A1 | 12/2015 | Green et al. |
| 2016/0008777 A1 | 1/2016 | Patel et al. |
| 2016/0045455 A1 | 2/2016 | Drevets et al. |
| 2016/0338977 A1 | 11/2016 | Singh et al. |
| 2017/0042878 A1 | 2/2017 | Fava et al. |
| 2017/0072005 A1 | 3/2017 | Moskal |
| 2017/0095429 A1 | 4/2017 | Erickson et al. |
| 2017/0151191 A1 | 6/2017 | Charney et al. |
| 2017/0181966 A1 | 6/2017 | Charney et al. |
| 2018/0015054 A1 | 1/2018 | Charney et al. |
| 2018/0042936 A1 | 2/2018 | Lombard |
| 2018/0064655 A1 | 3/2018 | Yu |
| 2018/0110742 A1 | 4/2018 | Pouget et al. |
| 2018/0177743 A1 | 6/2018 | Jay |
| 2018/0177744 A1 | 6/2018 | Jay |
| 2018/0235906 A1 | 8/2018 | Weg |
| 2018/0267015 A1 | 9/2018 | Meyer |
| 2018/0296478 A1 | 10/2018 | Salce, Jr. et al. |
| 2018/0325893 A1 | 11/2018 | Moskal et al. |
| 2019/0060254 A1 | 2/2019 | Sherman et al. |
| 2019/0083420 A1 | 3/2019 | Wainer et al. |
| 2019/0240184 A1 | 8/2019 | Hashimoto |
| 2019/0365672 A1 | 12/2019 | McCarty |
| 2020/0000748 A1 | 1/2020 | Kagan et al. |
| 2020/0000753 A1 | 1/2020 | Singh |
| 2020/0030251 A1 | 1/2020 | Tang et al. |
| 2020/0038420 A1 | 2/2020 | Barbut et al. |
| 2020/0138714 A1 | 5/2020 | Müller et al. |
| 2020/0261422 A1 | 8/2020 | Donoghue et al. |
| 2020/0318188 A1 | 10/2020 | Niculescu |
| 2020/0337999 A1 | 10/2020 | Wieczorek et al. |
| 2020/0383936 A1 | 12/2020 | Schmitz et al. |
| 2020/0384188 A1 | 12/2020 | Becker et al. |
| 2020/0397702 A1 | 12/2020 | Haruta |
| 2020/0405663 A1 | 12/2020 | Hashimoto |
| 2021/0032199 A1 | 2/2021 | Xiang et al. |
| 2021/0060009 A1 | 3/2021 | Snyder et al. |
| 2021/0113494 A1 | 4/2021 | Kagan et al. |
| 2021/0145851 A1 | 5/2021 | Stamets |
| 2021/0183519 A1 | 6/2021 | Raz et al. |
| 2021/0205232 A1 | 7/2021 | Zhao et al. |
| 2021/0308040 A1 | 10/2021 | Tan et al. |
| 2021/0308052 A1 | 10/2021 | Hong et al. |
| 2021/0308075 A1 | 10/2021 | Habboushe |
| 2021/0315840 A1 | 10/2021 | Robbins et al. |
| 2021/0353560 A1 | 11/2021 | Wieczorek et al. |
| 2021/0401774 A1 | 12/2021 | Turnipseed |
| 2022/0000805 A1 | 1/2022 | Yovell et al. |
| 2022/0001014 A1 | 1/2022 | Ghaderi |
| 2022/0020466 A1 | 1/2022 | Athey et al. |
| 2022/0040106 A1 | 2/2022 | Malcolm et al. |
| 2022/0054420 A1 | 2/2022 | Galaska et al. |
| 2022/0054461 A1 | 2/2022 | Osten et al. |
| 2022/0071929 A1 | 3/2022 | Hashimoto |
| 2022/0073589 A1 | 3/2022 | Gonzaga-Jauregui |
| 2022/0119338 A1 | 4/2022 | Lin et al. |
| 2022/0143041 A1 | 5/2022 | Javitt |
| 2022/0143051 A1 | 5/2022 | Manfredi et al. |
| 2022/0143147 A1 | 5/2022 | Sabban |
| 2022/0151955 A1 | 5/2022 | Wolfson et al. |
| 2022/0193000 A1 | 6/2022 | Tang et al. |
| 2022/0202742 A1 | 6/2022 | Yahav et al. |
| 2022/0226586 A1 | 7/2022 | Wieczorek et al. |
| 2022/0230723 A1 | 7/2022 | Wieczorek et al. |
| 2022/0241218 A1 | 8/2022 | Hammes et al. |
| 2022/0257536 A1 | 8/2022 | Sermone et al. |
| 2022/0280453 A1 | 9/2022 | Boyer et al. |
| 2022/0304950 A1 | 9/2022 | Canuso et al. |
| 2022/0313650 A1 | 10/2022 | Garcia et al. |
| 2022/0347123 A1 | 11/2022 | Loya et al. |
| 2022/0347124 A1 | 11/2022 | Witkin et al. |
| 2022/0378777 A1 | 12/2022 | Rodd |
| 2022/0401366 A1 | 12/2022 | Zana et al. |
| 2023/0022767 A1 | 1/2023 | Morris et al. |
| 2023/0049897 A1 | 2/2023 | Gershon et al. |
| 2023/0058618 A1 | 2/2023 | Aerts et al. |
| 2023/0064327 A1 | 3/2023 | Mehra et al. |
| 2023/0077183 A1 | 3/2023 | Habboushe |
| 2023/0089113 A1 | 3/2023 | Caers et al. |
| 2023/0095907 A1 | 3/2023 | Venturino et al. |
| 2023/0121313 A1 | 4/2023 | Jimidar et al. |
| 2023/0143693 A1 | 5/2023 | Linn et al. |
| 2023/0144704 A1 | 5/2023 | Malcolm et al. |
| 2023/0165805 A1 | 6/2023 | Müller et al. |
| 2023/0183238 A1 | 6/2023 | Osten et al. |
| 2023/0192593 A1 | 6/2023 | Nivorozhkin et al. |
| 2023/0210789 A1 | 7/2023 | Lee et al. |
| 2023/0233485 A1 | 7/2023 | Denny et al. |
| 2023/0248666 A1 | 8/2023 | Schumann et al. |
| 2023/0285323 A1 | 9/2023 | Hammes et al. |
| 2023/0285325 A1 | 9/2023 | Karaborni et al. |
| 2023/0293445 A1 | 9/2023 | Haswani et al. |
| 2023/0301939 A1 | 9/2023 | Reilly |
| 2023/0301941 A1 | 9/2023 | Moe et al. |
| 2023/0330043 A1 | 10/2023 | Rey |
| 2023/0355548 A1 | 11/2023 | Glue et al. |
| 2023/0375561 A1 | 11/2023 | Kaddurah-Daouk et al. |
| 2023/0390385 A1 | 12/2023 | Cowan |
| 2023/0414563 A1 | 12/2023 | Solomon |
| 2023/0420110 A1 | 12/2023 | Niculescu, III |
| 2024/0000728 A1 | 1/2024 | Drevets et al. |
| 2024/0009145 A1 | 1/2024 | Habboushe et al. |

(56) References Cited

U.S. PATENT DOCUMENTS

| | | |
|---|---|---|
| 2024/0024254 A1 | 1/2024 | Tang et al. |
| 2024/0065988 A1 | 2/2024 | Chen et al. |
| 2024/0099994 A1 | 3/2024 | Lin et al. |
| 2025/0170059 A1 | 5/2025 | Wieczorek et al. |

FOREIGN PATENT DOCUMENTS

| | | |
|---|---|---|
| WO | WO-96/25925 A1 | 8/1996 |
| WO | WO-2004/045601 A1 | 6/2004 |
| WO | WO-2007/111880 A2 | 10/2007 |
| WO | WO-2013/138322 A1 | 9/2013 |
| WO | WO-2014/020155 A1 | 2/2014 |
| WO | WO-2016/025581 A1 | 2/2016 |
| WO | WO-2016/187491 A1 | 11/2016 |
| WO | WO-2019/129397 A1 | 7/2019 |
| WO | WO-2020/064748 A1 | 4/2020 |

OTHER PUBLICATIONS

International Preliminary Report on Patentability for International Application No. PCT/EP18/76394 Jun. 30, 2020.
International Search Report and Written Opinion for International Application No. PCT/EP18/76394 dated Jun. 12, 2018.
Jonkman et al. "Pharmacokinetics and bioavailability of inhaled esketamine in healthy volunteers." Anesthesiology 127.4 (2017): 675-683.
Myers, "The science guiding selection of an aerosol delivery device", Respiratory care 58.11: 1963-1973 (2013).
Pfizer, "Material safety data sheet-(S)-(+)-Ketamine hydrochloride", Obtained from the internet (2008).
Anonymous: "Safety and Pharmacokinetic Study of Inhaled Esketamine in Healthy Volunteers." ClinicalTrials.gov, ClinicalTrials.gov ID NCT03407872, last updated Jul. 12, 2018, 11 pages.
Azouz, "Novel methodology to characterise how asthma and chronic obstructive pulmonary disease patients use their inhalers and methods to improve their inhaler technique Objective assessment of how patients use inhalers." Doctoral Thesis, University of Huddersfield (2012).
Begat et al., "The role of force control agents in high-dose dry powder inhaler formulations." Journal of pharmaceutical sciences 98.8 (2009): 2770-2783.
Bobo et al., "Ketamine for treatment-resistant unipolar and bipolar major depression: Critical review and implications for clinical practice." Depression and anxiety 33.8 (2016): 698-710.
Brunaugh et al., "Formulation techniques for high dose dry powders." International journal of pharmaceutics 547.1-2 (2018): 489-498.
Cai et al., "Preparation, characterization and pulmonary pharmacokinetics of a new inhalable zanamivir dry powder." Drug delivery 23.6 (2016): 1962-1971.
Canuso, C. M. et al. "Efficacy and Safety of Intranasal Esketamine for the Rapid Reduction of Symptoms of Depression and Suicidality in Patients at Imminent Risk for Suicide: Results of a Double-Blind, Randomized, Placebo-Controlled Study." American Journal of Psychiatry., vol. 175, No. 7, Apr. 11, 2018, pp. 620-630.
Cass et al., "Pharmacoscintigraphic evaluation of lung deposition of inhaled zanamivir in healthy volunteers." Clinical Pharmacokinetics 36 Suppl. 1 (1999): 21-31.
Chan et al., "Novel alternative methods for the delivery of drugs for the treatment of asthma." Advanced drug delivery reviews 55.7 (2003): 793-805.
Cheng, "Mechanisms of pharmaceutical aerosol deposition in the respiratory tract." AAPS PharmSciTech 15.3 (2014): 630-640.
Clark et al., "The confusing world of dry powder inhalers: it is all about inspiratory pressures, not inspiratory flow rates." Journal of aerosol medicine and pulmonary drug delivery 33.1 (2020): 1-11.
Daly et al., "Efficacy and safety of intranasal esketamine adjunctive to oral antidepressant therapy in treatment-resistant depression: a randomized clinical trial." JAMA psychiatry 75.2 (2018): 139-148.

De Boer et al., "A critical view on lactose-based drug formulation and device studies for dry powder inhalation: which are relevant and what interactions to expect ?. " Advanced drug delivery reviews 64.3 (2012): 257-274.
De Boer et al., "Dry powder inhalation: past, present and future." Expert opinion on drug delivery 14.4 (2017): 499-512.
DeLong et al., "Dose delivery characteristics of the AIR® pulmonary delivery system over a range of inspiratory flow rates." Journal of aerosol medicine 18.4 (2005): 452-459.
Dunbar et al., "In vitro and in vivo dose delivery characteristics of large porous particles for inhalation." International journal of pharmaceutics 245.1-2 (2002): 179-189.
Emery et al., "Flowability of moist pharmaceutical powders." Powder Technology 189.3 (2009): 409-415.
Extended European Search Report for EP Application No. 18461615.9 dated Apr. 11, 2019.
FDA, "Bridging for Drug-Device and Biologic-Device Combination Products Guidance for Industry—Draft Guidance." Dec. 2019.
FDA, "Metered Dose Inhaler (MDI) and Dry Powder Inhaler (DPI) Products—Quality Considerations Guidance for Industry—Draft Guidance, Revision 1." Apr. 2018.
Healy et al., "Dry powders for oral inhalation free of lactose carrier particles." Advanced drug delivery reviews 75 (2014): 32-52.
Hoppentocht et al., "Technological and practical challenges of dry powder inhalers and formulations." Advanced drug delivery reviews 75 (2014): 18-31.
Huynh et al., "An investigation into the powder release behavior from capsule-based dry powder inhalers." Aerosol Science and Technology 49.10 (2015): 902-911.
Ibrahim et al., "Inhalation drug delivery devices: technology update." Medical devices: evidence and research 8 (2015): 131-139.
International Preliminary Report on Patentability for International Application No. PCT/EP19/75735 mailed Apr. 8, 2021.
International Search Report and Written Opinion for International Application No. PCT/EP19/75735 mailed Dec. 17, 2019.
Jetzer et al., "Investigations on the mechanism of magnesium stearate to modify aerosol performance in dry powder inhaled formulations." Journal of pharmaceutical sciences 107.4 (2018): 984-998.
Jonkman, K. et al. "Ketamine inhalation." British Journal of Anaesthesia., vol. 118, No. 2, Feb. 2017, pp. 268-269.
Kaialy, "On the effects of blending, physicochemical properties, and their interactions on the performance of carrier-based dry powders for inhalation—A review." Advances in colloid and interface science 235 (2016): 70-89.
Kumon et al., "Application and mechanism of inhalation profile improvement of DPI formulations by mechanofusion with magnesium stearate." Chemical and Pharmaceutical Bulletin 56(5) (2008): 617-625.
Lapidus et al., "A randomized controlled trial of intranasal ketamine in major depressive disorder." Biological psychiatry 76.12 (2014): 970-976.
Lipp et al., "Preclinical and clinical assessment of inhaled levodopa for off episodes in Parkinson's disease." Science Translational Medicine 8.360 (2016): 360ra136 (10 pages).
Moon et al., "Delivery technologies for orally inhaled products: an update." AAPS PharmSciTech 20.3 (2019): 117 (17 pages).
Ógáin et al., "Particle engineering of materials for oral inhalation by dry powder inhalers. I—Particles of sugar excipients (trehalose and raffinose) for protein delivery." International journal of pharmaceutics 405.1-2 (2011): 23-35.
Peng et al., "Influence of physical properties of carrier on the performance of dry powder inhalers." Acta pharmaceutica sinica B 6.4 (2016): 308-318.
Pilcer et al., "Formulation strategy and use of excipients in pulmonary drug delivery." International Journal of Pharmaceutics 392 (2010): 1-19.
Pilcer et al., "Lactose characteristics and the generation of the aerosol." Advanced drug delivery reviews 64.3 (2012): 233-256.
Prime et al.. "Effect of disease severity in asthma and chronic obstructive pulmonary disease on inhaler-specific inhalation pro-

(56) References Cited

OTHER PUBLICATIONS files through the ELLIPTA® dry powder inhaler." Journal of Aerosol Medicine and Pulmonary Drug Delivery 28(6) (2015): 486-497.
Rahimpour et al., "Alternative carriers in dry powder inhaler formulations." Drug discovery today 19.5 (2014): 618-626.
Rubin et al., "Emerging aerosol drug delivery strategies: from bench to clinic." Advanced drug delivery reviews 75 (2014): 141-148.
Sahakijpijarn et al., "Post-inhalation cough with therapeutic aerosols: Formulation considerations." Advanced Drug Delivery Reviews 165-166 (2020): 127-141.
Sharma et al., "Techniques to Determine Powder Flow Properties." CGC International Journal of Contemporary Technology and Research ISSN: 2582-0486 (online) vol. 3, Issue—2 (2021): 199-204.
Sibum et al., "Challenges for pulmonary delivery of high powder doses," International Journal of Pharmaceutics 548.1 (2018): 325-336.
Vehring, "Pharmaceutical particle engineering via spray drying." Pharmaceutical research 25.5 (2008): 999-1022.
Weers et al., "Design of fine particles for pulmonary drug delivery." Expert opinion on drug delivery 4.3 (2007): 297-313.
Yang et al., "Pulmonary drug delivery by powder aerosols." Journal of Controlled Release 193 (2014): 228-240.
Yeung et al., "Dosing challenges in respiratory therapies." International journal of pharmaceutics 548.1 (2018): 659-671.
Zhou et al., "Emerging inhalation aerosol devices and strategies: where are we headed?." Advanced drug delivery reviews 75 (2014): 3-17.
Zhou et al., "Improving aerosolization of drug powders by reducing powder intrinsic cohesion via a mechanical dry coating approach." International Journal of Pharmaceutics 394 (2010) 50-59.
Zhou et al., "Inhaled formulations and pulmonary drug delivery systems for respiratory infections." Advanced drug delivery reviews 85 (2015): 83-99.
Zijlstra, "Dry powder inhalation of biopharmaceuticals: from formulation to proof-of-concept." Dissertation, University of Groningen (2009).
Anonymous, "Inhalants." National Institute on Drug Abuse, Sep. 18, 2024, accessible at https://nida.nih.gov/research-topics/inhalants.
Extended European Search Report for EP Application 25162744.4 dated Aug. 1, 2025.
Fasiolo et al., "Opportunity and challenges of nasal powders: Drug formulation and delivery." European Journal of Pharmaceutical Sciences 113 (2018): 2-17.
Lapidot et al., "A novel faster-acting, dry powder-based, naloxone intranasal formulation for opioid overdose." Pharmaceutical Research 39 (2022): 963-975.
Pozzoli et al., "Dry powder nasal drug delivery: challenges, opportunities and a study of the commercial Teijin Puvlizer Rhinocort device and formulation." Drug Development and Industrial Pharmacy 42(10) (2016): 1660-1668.
Shahi et al., "A technology overview on advanced drug administration devices for effective nose-to-brain delivery." Direct Nose-to-Brain Drug Delivery (2021): 417-427.
Tepper et al., "Breath-powered sumatriptan dry nasal powder: an intranasal medication delivery system for acute treatment of migraine." Medical Devices: Evidence and Research (2018): 147-156.

* cited by examiner

DRY POWDER ESKETAMINE COMPOSITION FOR USE IN THE TREATMENT OF BIPOLAR DEPRESSION BY PULMONARY ADMINISTRATION

This Application is a Continuation of application Ser. No. 16/958,965 filed Jun. 29, 2020, which is a § 371 National Stage of PCT/EP18/76394, filed Sep. 28, 2018, claiming priority to European Application No. 17461651.6 filed Dec. 29, 2017, the contents of each of which are hereby incorporated by reference into this application.

CROSS-REFERENCE TO RELATED APPLICATIONS

This Application is a Continuation of application Ser. No. 16/958,965 filed Jun. 29, 2020, which is a § 371 National Stage of PCT/EP18/76394, filed Sep. 28, 2018, claiming priority to European Application No. 17461651.6 filed Dec. 29, 2017, the contents of each of which are hereby incorporated by reference into this application.

TECHNICAL FIELD

The present invention relates to a composition comprising ketamine, in particular dry powder formulation for use in a method of treatment of depression by pulmonary administration.

PRIOR ART

Depression, especially major depressive disorder, bipolar disorder and treatment-resistant depression (TRD) is a serious problem in a modern society. Many treatment options have been developed for treating depression, including monotherapy or combination therapy in a convenient for patients oral administration regimen. However, there is a relatively high percentage of patients that are treatment-refractory or partially or totally treatment-resistant to existing antidepressants. In practice, at present the only real choice in such severe cases can be electroshocks.

Ketamine is a known anesthetic and analgetic, used for anesthesia and in the treatment of chronic pain. Ketamine is a chiral compound and can exist as a racemate and as S-enantiomer (known as esketamine) or R-enantiomer (known as arketamine). Ketamine can form a pharmaceutically acceptable salts and in pharmaceutical applications is generally used as preferred hydrochloride salt. The optical rotation of an enantiomer varies between ketamine and its salts. For example, while esketamine free base is dextrarotatory S-(+), esketamine hydrochloride is levorotatory S-(−).

Since about one decade antidepressant activity of ketamine and its S-isomer (esketamine) is explored, especially in the treatment of treatment-resistant or treatment refractory depression (G. Serafini et al., The Role of Ketamine in Treatment-Resistant Depression: A Systematic Review., Current Neuropharmacology, 2014, 12, 444-461). Treatment-resistant depression is a term used in clinical psychiatry to describe cases of major depressive disorder that do not respond adequately to appropriate courses of at least two antidepressants in a suitable dose for a suitable time.

Data collected up to now show exceptional properties of ketamine and esketamine. The effect is very quick (after 2-3 hours from administration) and relatively long-lasting—a few days after single dose of a medicament. The rapidity of the clinical effect is surprisingly high and unexpected, since the effect of antidepressants present on the market appears after at least two weeks, even three to four weeks of day-to-day administration. Therefore, ketamine or esketamine could be used as a drug of first choice in patients with major depression with enhanced suicide risk that are resistant to existing oral antidepressants. The scale of the effect is also very high; about ⅔ of the patients with treatment-resistant depression is responsive to ketamine treatment.

The knowledge of the pharmacology of ketamine is still poor. As a dissociative anesthetic, the drug may exert dissociative and psychomimetic effects (DP). Available data show that this effects are correlated with systemic concentration of the drug. Dissociative and psychomimetic effects are among most often observed side-effects and significantly lower the comfort of patients. However, there are still groups of patients that respond to the treatment with ketamine without experiencing DP effects. Hence, still exists a therapeutic window, although narrow, for effective and safe use of ketamine in the treatment of depression without DP.

Ketamine undergoes extensive first-pass metabolism effect in the liver. Primarily, norketamine is produced as the initial metabolite. Norketamine is then metabolized to further metabolites. The knowledge about norketamine and further metabolites is still not full. On the level of action on NMDA receptor norketamine is many times less active than ketamine. Other metabolites are also mostly less active than ketamine. Furthermore, little is known about toxicity of norketamine and other metabolites. This, in combination with high individual variations of their concentrations dependent on the status of hepatic enzymes, as a rule makes them undesired compounds. There are also reports on correlation of some hydroxylated metabolites of ketamine with psychotic and dissociative symptoms.

In previous studies ketamine and esketamine were administered in the treatment of depression intravenously or intranasally. Attempts of oral administration were generally unsuccessful or the effects were observed only after several weeks of administration.

Literature describes many examples of ketamine pharmacokinetics depending on the administration route.

Administration route with currently expected minimum level of metabolites is an intravenous one. After intravenous infusion of racemic ketamine at 0.5 mg/kg for 40 minutes, the parent drug maintains its systemic concentration about 200 ng/ml for about 40 minutes, afterwards the concentration falls down quickly with a half-period below 2 hours. Simultaneously, norketamine reaches its maximum concentration at the level of 10-20% of ketamine concentration. The percentage of area-under-curve (AUC) norketamine to ketamine is about 20-40%.

Oral administration is the administration route, after which maximum concentration of metabolites is expected. However, after oral administration the drug rapidly undergoes metabolism to norketamine. Norketamine level is equal to 500-1000% of ketamine level. Area-under-curve (AUC) for norketamine is even higher, exceeding 1000%.

The bioavailability of orally administered ketamine is very low (ca. 16-20%); while intravenous administration results in marked increase in ketamine bioavailability, it has also many disadvantages (e.g. long-time of infusion, patient discomfort, need for surveillance).

US2007/0287753A1 discloses the use of ketamine for treating treatment-resistant or refractory depression. The only formulation tested is the intravenous infusion, and transdermal administration is contemplated as well. Intranasal administration is only generally described, including intranasal administration of a dry powder aerosol formulation comprising finely divided powder of ketamine, a dispersant and bulking agent. However, with intranasal administration ketamine to oropharyngeal area significant amounts of ketamine will be swallowed by a patient by oral route and can undergo systemic metabolism to norketamine to cause undesired side effects.

DE102007009888 discloses the use of S-ketamine in the treatment of depression, in the dosage of 0.3 to 1.0 mg/kg. Although all possible administration routes are generally mentioned, the only formulation tested is intravenous infusion, mentioned as the preferred one.

WO2013/138322 discloses the use of esketamine in the treatment of treatment-refractory or treatment-resistant depression. Test for efficacy of esketamine was described in prophetic example with esketamine intravenous infusion.

WO2014/143646 and WO2014/152196 disclose pharmaceutical composition of esketamine in the form of the aqueous formulation of esketamine hydrochloride, preferably for nasal administration, for use in the treatment of treatment-refractory or treatment-resistant depression.

Mucoadhesive oral forms of esketamine and pharmacokinetics of esketamine after oral, intranasal and intravenous administration are described in WO2014/020155.

K. Jonkman et al., Anesthesiology 127 (4), 675-683, 10, 2017, studied on healthy volunteers the safety and feasibility of delivery of ketamine by inhalation of nebulized esketamine hydrochloride saline solution as a new route of ketamine administration. It has been found that inhaled ketamine bioavailability was reduced due to both dose-independent and dose-dependent impairment of pulmonary uptake. This was related to the high viscosity of esketamine; the viscosity of esketamine is three to four times greater than that of water. Because of this the administration via nebulization will be imprecise and non-reliable.

Singh et al., Biological Psychiatry 80:424-413, 2016, observed a rapid onset of robust antidepressant effects in patients with treatment resistant depression (TRD) after a 40-minute i.v. infusion of either 0.20 mg/kg or 0.40 mg/kg of esketamine. The lower dose may allow for better tolerability while maintaining efficacy.

The above illustrates the absolute medical need and importance of development of high-dose ketamine formulation that is both highly effective as well as convenient and easy to everyday self-administration by the patient including self-administration on out-patient basis to ensure high patient compliance. Such a formulation should first of all deliver therapeutic ketamine dose to the blood, should be characterized with high effectiveness, including rapid therapeutic effect and low risk of undesired effects, such as DP, due to precise dosing. Such a formulation should allow only a minimum level of systemic first-pass metabolites such as norketamine and hydroxylated metabolites, especially assure acceptable (es)ketamine to (es)norketamine ratio, both in view of avoiding reduction of ketamine level actually administered and unwanted metabolites effects.

The target was to achieve similar ketamine plasma concentration and hence similar antidepressant effect as that by Sing et al. with intravenous infusion of 0.20 mg/kg lasting 40 minutes using route of administration more convenient for a patient and producing less adverse effects.

The above problems have been solved by the present invention that provides a high-dose and stable dry powder ketamine pharmaceutical composition for use in a method of treatment of depression by pulmonary administration route in a reliable, reproducible and convenient manner.

SUMMARY OF THE INVENTION

The invention provides a dry powder pharmaceutical composition comprising ketamine or a pharmaceutically acceptable salt thereof as a medicine for use in a method of treatment of depression by pulmonary administration.

In another aspect, the invention provides ketamine or its pharmaceutically acceptable salt for use in a method of treatment of depression, wherein ketamine or its pharmaceutically acceptable salt is administered by pulmonary route as a dry powder pharmaceutical formulation.

In another aspect, the invention provides a method of treatment depression in a subject in need thereof, wherein ketamine or its pharmaceutically acceptable salt is administered to a subject by pulmonary route as a dry powder pharmaceutical formulation.

The invention will be described in more detail below, with reference to the drawing, wherein:

FIG. 1 presents NGI deposition data for the composition of Example 1;

FIG. 2 presents NGI deposition data for the composition of Example 2;

FIG. 3 presents NGI deposition data for the composition of Example 3;

FIG. 4 presents NGI deposition data for the composition of Example 4;

FIG. 5 presents NGI deposition data for the composition of Example 5;

FIG. 6 presents NGI deposition data for the composition of Example 6;

Figure 9:
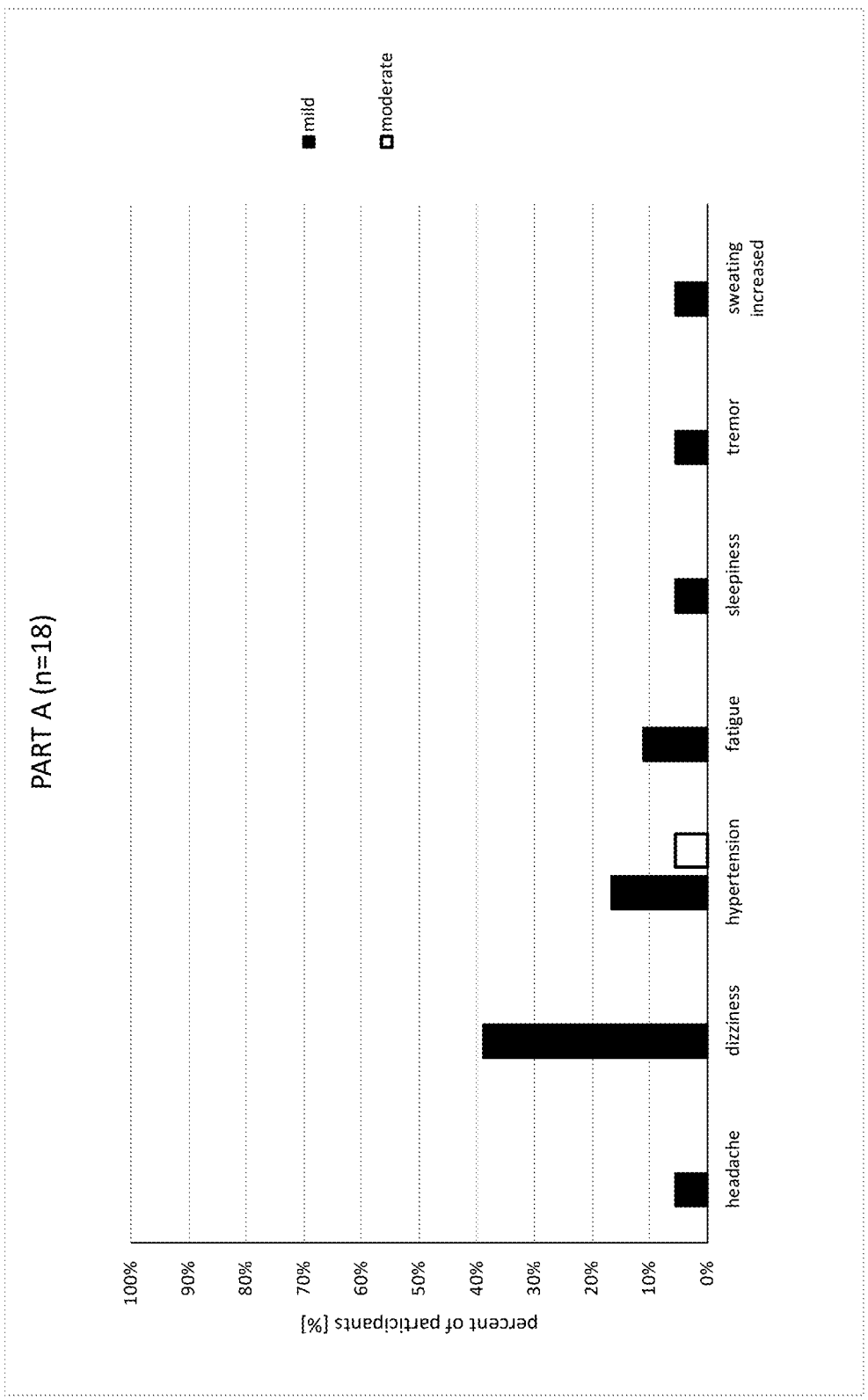
Figure 10:
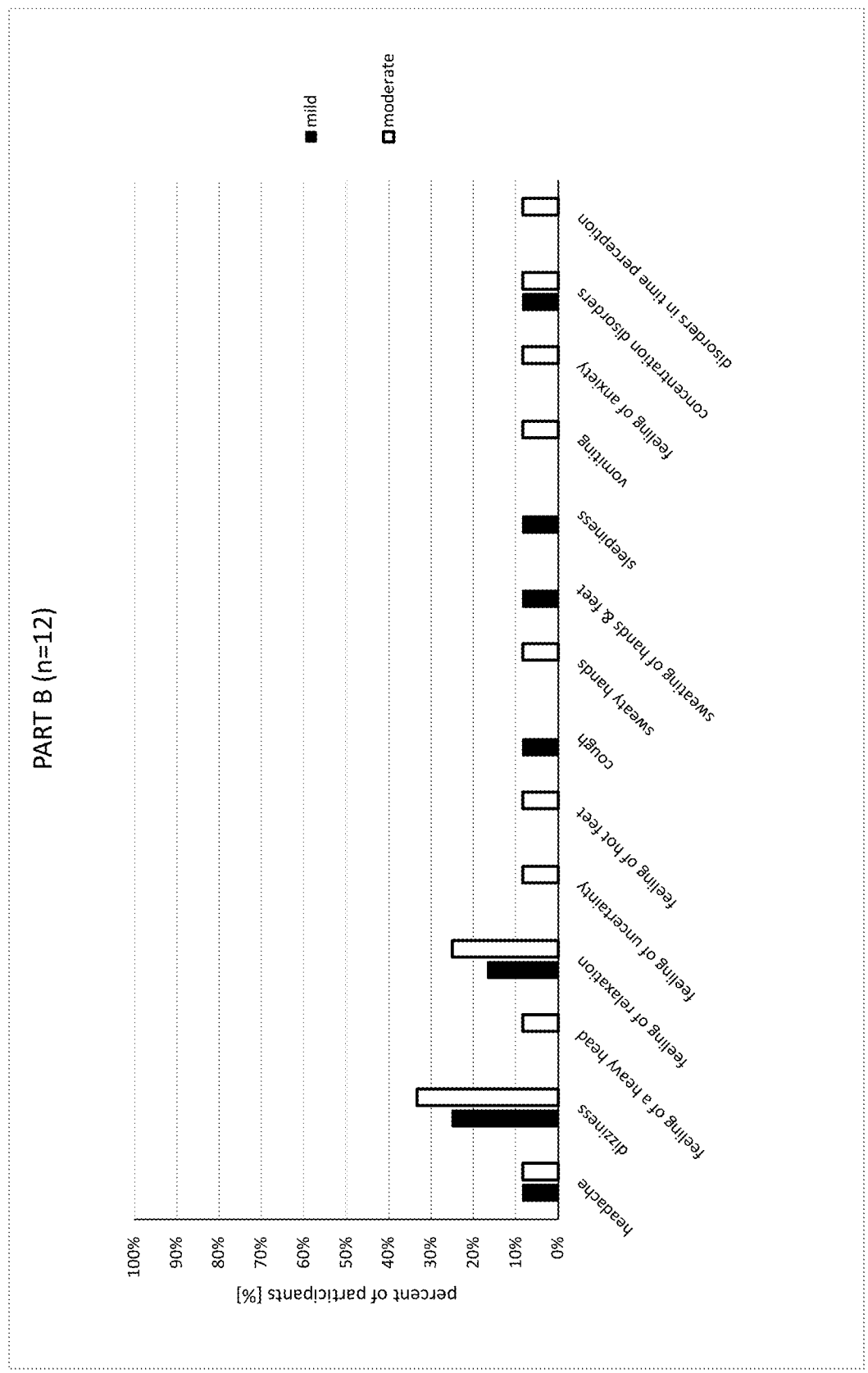

FIG. 9 presents adverse effect distribution after administration of dry powder composition of Example 2; and FIG. 10 presents adverse effect distribution after administration of dry powder composition as described in Part B of Example 7.

DETAILED DESCRIPTION OF THE INVENTION

The object of the invention is a dry powder pharmaceutical composition comprising ketamine or its pharmaceutically acceptable salt as a medicine for use in a method of treatment of depression by pulmonary administration, i.e. administration via pulmonary route.

Another object of the invention is ketamine or its pharmaceutically acceptable salt for use in a method of treatment of depression, wherein ketamine or its pharmaceutically acceptable salt is administered by pulmonary route as a dry powder pharmaceutical formulation.

Another object of the invention is a method of treatment of depression in a subject in thereof, wherein ketamine or its pharmaceutically acceptable salt is administered to a subject by pulmonary route as a dry powder pharmaceutical formulation.

Preferably, in the use according to the invention, esketamine, especially esketamine hydrochloride, is self-administered pulmonary by a patient by inhalation of a dry powder esketamine composition or formulation in a sequence of administrations consisting of multiple single doses (inhalation events), such as at least 3 single doses, each inhalation event consisting of multiple puffs, such as 1, 2, 3 or 4 puffs, preferably in 3 or 4 puffs, said sequences being separated from each other by a break period without any inhalation (rest period). Preferably, such as sequence lasts at least 30 minutes, for example lasts 30 minutes, and includes 3 sequences of administration and break periods between are preferably equal, i.e. are 15 minutes break (rest) period.

Preferably, in the use according to the invention, esketamine, especially esketamine hydrochloride, is self-administered pulmonary by a patient by inhalation of a dry powder esketamine composition or formulation in a sequence lasting 30 minutes consisting of 3 single doses (inhalation events), each inhalation event consisting of 3 or 4 puffs, wherein each puff corresponds to esketamine nominal dose of 4 mg in the dry powder composition or formulation. Such a composition or formulation is described in Example 2 below. Between such each inhalation event (single dose) there is provided a break period without any inhalation, preferably there are two equal breaks lasting about 15 minutes, i.e. first single dose is administered at time 0, second single dose is administered after about 15 minutes and the third single dose is administered at 30 minute. Such a sequence allows to obtain plasma concentration profile that provides plasma concentration infusion at the level having antidepressant effect, as known from prior art tests of intravenous infusions.

According to the invention, the term "ketamine" encompasses racemic ketamine and its enantiomers esketamine and arketamine, both as a free base and pharmaceutically acceptable salts thereof.

In a preferred embodiment ketamine is esketamine.

In another embodiment, ketamine is racemic ketamine.

Preferred pharmaceutically acceptable ketamine salt is hydrochloride.

In a most preferred embodiment, the composition of the invention comprises esketamine hydrochloride.

In another embodiment, the composition of the invention comprises racemic ketamine hydrochloride.

Preferably, in the use according to the invention, ketamine, especially esketamine such as esketamine hydrochloride, is self-administered pulmonary by a patient by inhalation of a dry powder ketamine composition or formulation in a sequence of administrations consisting of multiple single doses (inhalation events), such as at least 3 single doses, each single dose or inhalation event consisting of multiple puffs, such as 1, 2, 3 or 4 puffs, preferably in 3 or 4 puffs, said sequences being separated from each other by a break period without any inhalation (rest period). Preferably, such as sequence lasts at least 30 minutes, for example lasts 30 minutes, and includes 3 sequences of administration and break periods between are preferably equal, i.e. are 15 minutes break (rest) period.

Preferably, in the use according to the invention, esketamine such as esketamine hydrochloride, is self-administered pulmonary by a patient by inhalation of a dry powder esketamine composition or formulation in a sequence lasting 30 minutes consisting of 3 single doses (inhalation events), each inhalation event consisting of 3 or 4 puffs, wherein each puff corresponds to esketamine nominal dose of 4 mg in the dry powder composition or formulation. Such a composition or formulation is described in Example 2 below. Between such each inhalation event (single dose) there is provided a break period without any inhalation, preferably there are two equal breaks lasting about 15 minutes, i.e. first single dose is administered at time 0, second single dose is administered after about 15 minutes and the third single dose is administered at 30 minute. Such a sequence allows to obtain plasma concentration profile that provides plasma concentration infusion at the level having antidepressant effect, as known from prior art tests of intravenous infusions.

The term "medicine" as used herein can be used interchangeably with the term "medicinal product". It should be understood that "medicine" and "medicinal product" have essentially the same meaning in terms of the invention.

The term "treatment-resistant or treatment refractory depression" (TRD) is well known in the art and means depression in patients not responding to at least two prior attempts of adequate antidepressive treatment using commonly known antidepressant therapies. The term is generally described for example in U.S. Pat. No. 8,785,500 and US2015/0056308.

The term "bipolar disorder" is well known in the art and means a disorder that causes periods of depression and periods of abnormally elevated mood.

The term "major depression" is well known in the art and means a disorder characterized by at least two weeks of low mood that is present across most situations.

In one aspect the composition of the invention comprises from 2 mg to 100 mg of ketamine calculated as a free base per nominal unit dose.

In a particular embodiment, the composition of the invention comprises from 2 mg to 60 mg of ketamine, especially 2 mg to 40 mg of ketamine, such as from 3 mg to 15 mg of ketamine, calculated as a free base, per nominal unit dose.

In another embodiment, the composition of the invention comprises further one or more additives selected from the group consisting of a carbohydrate bulking agent in the amount of 30 to 95% by weight and a stabilizing agent in the amount of 0.2-3% by weight, with respect to the total weight of the composition.

The composition comprises ketamine, especially esketamine hydrochloride, having median particle diameter d50 of 1-10 μm, such as 1-8 μm, especially 3 μm, d10 of 0.2-5 μm and d90 of 3-35 μm.

Median particle size $d_{50}$ is a parameter obtained by laser diffraction technique with dry dispersion using Sympatec HELOS laser diffractometer attached with ASPIROS feeder. For measurement, raw ketamine, especially esketamine hydrochloride, is dispersed with pressure 3.0 bar in total amount of 30 mg per sample.

The composition is a dry powder formulation for administration using dry powder inhalers. Conventional and typical dry powder inhalers can be used for this purpose.

The term "dry powder" is known for a skilled person and should be understood in a manner conventional in the art as a solid mix of particles that is fluidized when the patient inhales after actuation of the inhaler device.

The term "nominal unit dose" in accordance with the invention relates to the ketamine dose as present (loaded) in the composition that is destined for a single administration. The nominal unit dose can be a measured dose of the dry powder to be ready for the patient to take, contained in a single unit, such as a capsule or single compartment in a blister, or a dose to be taken from for delivery from the multi-dose dry powder reservoir.

The term "emitted dose" relates to the proportion of the nominal unit dose that exits/leaves the device after inhalation by a patient.

The dry powder pharmaceutical composition or formulation for use according to the invention may comprise further pharmaceutical excipients., i.e. one or more additives selected from the group consisting of a carbohydrate bulking agent (a carrier) in the amount of 30 to 95% by weight and a stabilizing agent in the amount of 0.2-3% by weight, with respect to the total weight of the composition.

Suitable carbohydrate bulking agent (a carrier) can be lactose, D-mannitol, glucose monohydrate, trehalose, especially trehalose dihydrate, erythritol, dextrose, maltose, sorbitol or xylitol. Especially convenient bulking agent is milled lactose, such as lactose monohydrate or anhydrous lactose, especially lactose monohydrate, having suitable granulometry. Suitable granulometry is defined as having $d_{50}$ 30-200 µm (Sympatec HELOS) as the main coarse fraction (especially 80 µm). Examples of suitable lactose monohydrate commercial grades are Lactohale 200 (LH200), Lactohale 100 (LH100) and Lactohale 200LP. Various types of inhalers may require appropriate selection of lactose grade most suitable for performance thereof. Such a selection is within common skills of a skilled person.

Typical amount of the bulking agent in the composition of the invention is 30-95% by weight, especially 30 to 80% by weight, with respect to the total weight of the composition.

Pharmaceutical excipients/additives include also a stabilizer (also called force control agent—FCA), i.e. a substance that reduces adhesion and cohesion. Suitable stabilizers are for example magnesium stearate, lecithin, and aminoacids, such as leucine. Especially preferred stabilizer is magnesium stearate.

Stabilizer "disturbs" the weak binding forces between the small particles and thus helps to keep the particles separated, reduces self-adhesion of small particles and also adherence to other particles in the formulation if such other particles are present, reduces the adhesion to the inner surfaces of the inhaler, as well as improves rheological properties of powder—powder flowability.

The amount of the stabilizer in the composition of the invention is 0.2-3% by weight, especially 0.8% by weight, with respect to the total weight of the composition.

Composition or formulation for use according to the invention is prepared by blending in a high-shear mixer a bulking agent/carrier of suitable granulometry with a stabilizer, and then adding ketamine, especially esketamine hydrochloride, of suitable granulometry and again blending in a high-shear mixer.

Alternatively, ketamine, especially esketamine hydrochloride, of suitable granulometry is co-processed (blended) with a stabilizer in a high-shear mixer, and then the bulking agent/carrier is added and again mixed in a high-shear mixer.

The composition is a dry powder formulation for administration using dry powder inhalers. Conventional and typical dry powder inhalers can be used for this purpose.

The formulation may be administered by three device categories: single-unit dose inhaler in which each dose, such as in a capsule, is loaded into the device before use; a multi-dose reservoir inhaler in which a bulk supply of dry powder with plurality of doses is preloaded into the device; and a multi-unit dose inhaler in which a plurality of single doses are individually sealed in separate compartments such as in a blister cavity, and discharged each time the device is actuated. Preferred is the multi-unit dose inhaler in which a plurality of single doses are individually sealed, such as in the blister, and discharged each time the device is actuated.

In one embodiment of the use according to the invention as defined above, the medicine for administration via pulmonary route is a blister with plurality of individual nominal unit doses premetered and individually sealed. One preferred example of such an inhaler is Diskus type inhaler.

In another embodiment of the use according to the invention as defined above, the medicine for administration via pulmonary route is a capsule with a single nominal unit dose.

In another embodiment of the use according to the invention as defined above, the medicine for administration of a single dose via pulmonary route is a multi-dose powder reservoir.

The composition for use according to the invention provides emitted dose of at least 1.0 mg of ketamine calculated as a free base, corresponding to 1.2 mg of ketamine hydrochloride.

The composition for use according to the invention provides the fraction of the dose delivered locally directly to the lungs that is at least 40%, such as from 40 to 50%, especially 40% to 60%, especially up to 85%, of the emitted unit dose.

Emitted dose is the portion of nominal unit dose that is emitted from the inhaler device and leaves the inhaler device as an aerosol and hence is available to the patient.

Only part of emitted dose reaches the lungs and thus circulating blood of a patient as the dose delivered to the lungs (also called Fine Particle Dose—FPD) or fraction delivered to the lungs (also called Fine Particle Fraction—FPF). Some part reaches gastrointestinal tract via oropharyngeal and oral routes, i.e. is swallowed, and is accessible for undesired first-part metabolism.

It has been surprisingly found that in spite of well-known problems with inhalation dry powder formulation of high doses of an active substance for pulmonary administration, the uniform and stable high-dose ketamine, especially esketamine hydrochloride dry powder composition can be obtained that when administered by pulmonary route provides therapeutic ketamine level in the circulating blood of a patient, i.e. at least 50 to 100 ng/ml, such as 70 to 100 ng/ml, such as 70-80 ng/ml, such as about 100 ng/ml. Therapeutic ketamine level relates to the level in the blood that is effective in the treatment of depression, especially major depressive disorder, such as treatment resistant or treatment-refractory depression, and may be dependent on the subject, gender, age, severity of the disease, the type of the inhaler, and may vary depending on whether ketamine is racemic ketamine or enantiomeric ketamine.

The fraction of the emitted dose delivered to the lungs is surprisingly high, in contrast with typical inhalation compositions wherein the standard is that only 15 to 20% of the emitted dose is delivered to the lungs.

The fraction of the emitted dose delivered locally directly to the lungs (also called Fine Particle Fraction—FPF) can be determined using well-known and conventional methods and assays. Such methods and assays include any of those described in European Pharmacopeia 9.0, Chapter 2.9.18, Preparations for inhalation; Aerodynamic assessment of fine particles for determination of Fine Particle Dose. In particular, the Next Generation Pharmaceutical Impactor (NGI) (Ph. Eur. Apparatus E) can be used to assess and control the aerodynamic particle size distribution (APSD). The NGI apparatus is as presented in FIGS. 2.9.18.-12 and 2.9.18.-13 on page 333 of European Pharmacopeia 9.0.

Emitted dose and fine particle dose and fraction (FPF and FPD) are strongly dependent on two factors i.e. on the formulation and on the device. For the device the most discriminatory factor for emitted dose is resistance. The resistance of a dry powder inhaler (DPI) is an intrinsic value which depends on the design of the inhalation channel, the metering cup and the air inlets. DPIs can be classified into four resistance groups (low, medium, medium-high, high) with respect to the inhalation flow required to produce a pressure drop of 4 kPa. This value was chosen because it is the one recommended by pharmacopoeia for the in vitro characterization of the dose emitted from a DPI. Additionally for capsule-based DPIs can be limited by the powder retention in the capsule and device, which lead to reduction in the emitted dose.

Emitted dose testing is relatively straightforward. The device is 'fired' into a sampling apparatus that enables the capture of the measured dose on a filter. The aerodynamic particle size distribution of inhaled products is measured using the technique of multistage cascade impaction, here Next Generation Impactor (NGI). The collected quantity of active ingredient is determined further by HPLC analysis. The inhalers are tested at a predetermined flow rate, and the pressure drop across the inhaler is 4.0 kPa in line with the Ph Eur.

Efficient particle capture is ensured by coating the particle collection surface of each of stages 1-7, as well as the MOC and the pre-separator base, with a coating substance. The central cup of the pre-separator is filled with adequate diluent.

After discharging the powder to the NGI (Number of actuations per impactor n=1 for one analysis) by opening the two-way solenoid valve for the required time at flow control which generate pressure drop across the inhaler 4 kPa the following operations are performed:
 I. Stages 1 to 7 and MOC. Each stage is washed with appropriate diluent (extraction of drug substance). NGI tray loaded with the cups on a Copley Gentle Rocker is gently shaken for 10 minutes.
 II. Mouthpiece adapter. Deposited inhalation powder on adapter is rinsed with appropriate diluent a volumetric flask and sonicated for 10 minutes.
 III. Induction port. Deposited inhalation powder from induction port is rinsed with appropriate diluent into a volumetric flask and sonicated for 10 minutes.
 IV. Preseparator. Deposited inhalation powder from these component is rinsed with appropriate diluent into a volumetric flask and sonicated for 10 minutes.

Finally collected samples from each stage of impactor are filtered analyzed by high-performance liquid chromatography Composition of for use according to the invention has an appropriate ketamine, in particular esketamine hydrochloride pharmacokinetics profile that enables achievement of approximately 50 to 100 ng/ml of the ketamine plasma concentration over 40 minutes after pulmonary administration directly to the lungs by inhalation. Said plasma concentration corresponds to antidepressive effect. Maintaining this concentration over time mimics 40-minute intravenous infusion known to be effective in depression and well-tolerated.

The present invention will now be with reference to the accompanying examples, which are not intended to be limiting.

EXAMPLES

General Manufacturing Procedure:

A sum of lactose monohydrate and magnesium stearate are sieved through 0.25 mm mesh and mixed in high-shear mixer for 3 minutes. Obtained mixture is sieved with active substance through 0.5 mm mesh and mixed in high-shear mixer for 5 minutes.

To eliminate electrostatic charges, antistatic PE bags are used during the process.

Vacuum Filling Process (Blisters):

Vacuum-drum technology dose forming process is used for blister filling. The blister cavity is in volume range of 15 to 45 $mm^3$ (especially ca. 30 $mm^3$). Powder which is filled into cavity is in amount of 10-30 mg (especially 23 mg).

During process parameters of vacuum-drum device are:

Vacuum pressure: –0-500 mBar, especially 50-400 mBar

Fluidization pressure:—0.1-–0.4 Bar

Fluidization time: 50-2000 ms, especially 50-300 ms

Filling time: 50-700 ms, especially 50-400 ms

Sealing time: 100-600 ms

Sealing tests of filled blisters are performed under vacuum.

Finally, the blister strips are coiled into the medical device.

Filling Process (Capsules):

Capsules to be filled are placed in the sockets closed ends down. Powder is discharged from the dosator and comes directly to the capsules. The powder with which the capsules are to be filled is placed in the dosator, may be tamped and discharged into the capsules.

During the process parameters of capsule filling device are:

Rotation: 1-70 rpm

Tamping high: 1-10 mm

Dosator high: 1-250 mm

Finally, the filled capsules are mounted into the medical device.

Ketamine Dry Inhalation Powder for Blisters and Capsules

The following compositions has been prepared in accordance with the above general procedure in the scale of 0.9 kg.

Example 1

| Component | Amount (mg/unit) |
|---|---|
| Esketamine hydrochloride | 3.45 (corresponds to 2.99 mg esketamine) |
| Lactose monohydrate LH200 LP | 19.16 |
| Magnesium stearate | 0.39 |

Example 2

| Component | Amount (mg/unit) |
|---|---|
| Esketamine hydrochloride | 4.61 (corresponds to 4 mg esketamine) |
| Lactose monohydrate LH200 LP | 18.20 |
| Magnesium stearate | 0.18 |

Example 3

| Component | Amount (mg/unit) |
|---|---|
| Esketamine hydrochloride | 5.06 (corresponds to 4.39 mg esketamine) |
| Lactose monohydrate LH200 LP | 17.581 |
| Magnesium stearate | 0.359 |

The compositions have been found uniform in accordance with requirements of Ph.Eur.2.9.40. Average esketamine hydrochloride content (n=10) was in the range 92.5%-107.5% of nominal dose.

The process has been found scalable to the scale of 1.8 kg.

Aerodynamic Particle Size Distribution (APSD) test of the compositions of the Examples 1, 2 and 3 of the invention.

The compositions of Examples 1, 2 and 3 of the invention have been tested using the Next Generation Pharmaceutical Impactor (NGI) (Ph. Eur. Apparatus E) in accordance with the procedure for powder inhalers.

Figure 1:
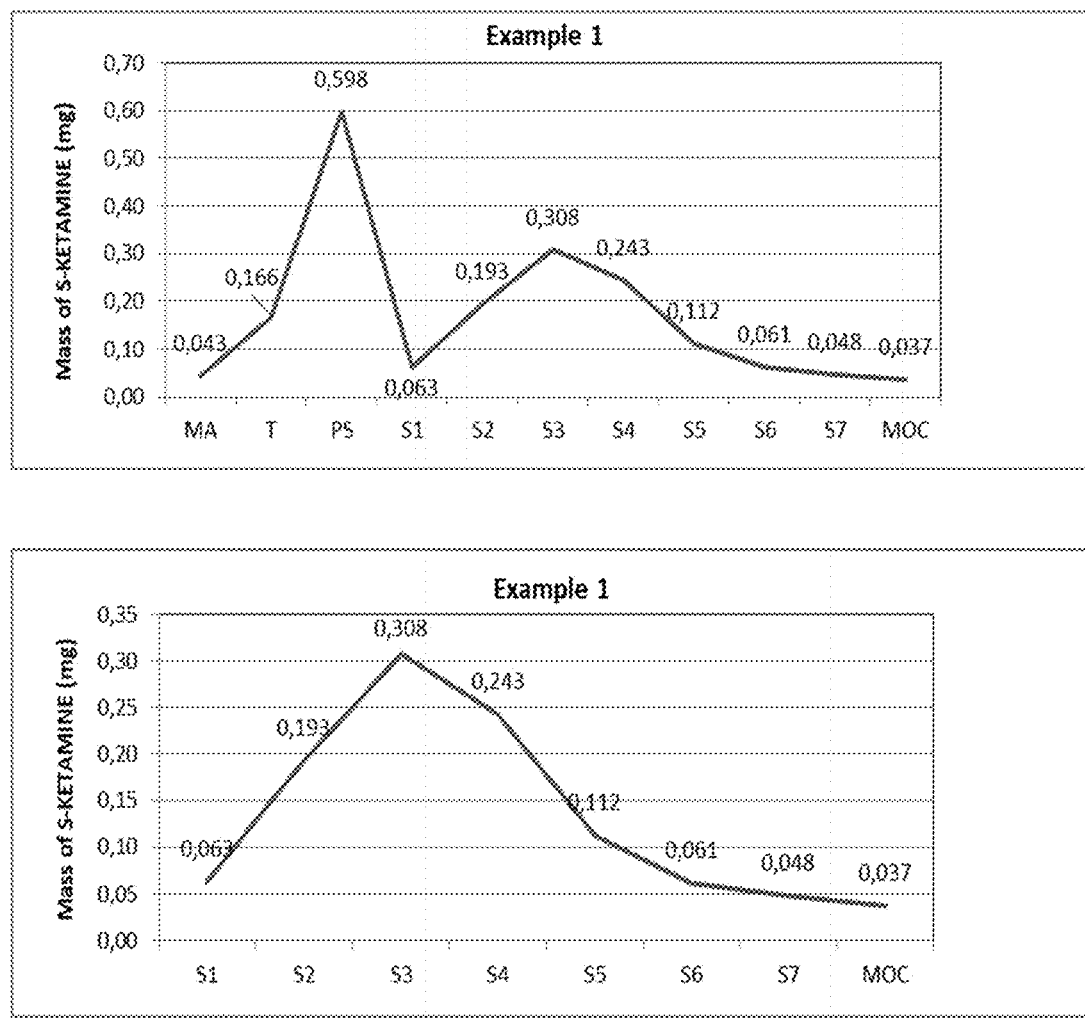
Figure 2:
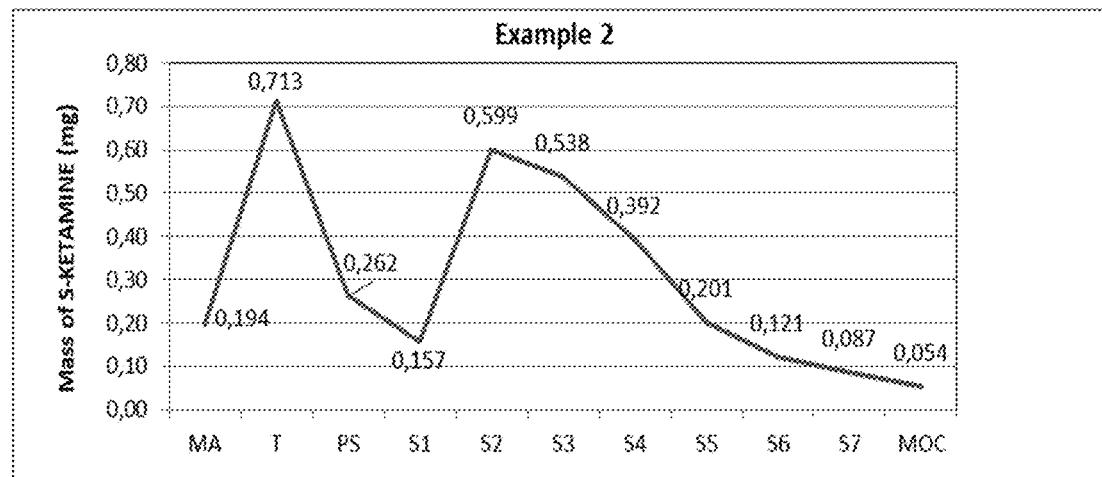
Figure 2:
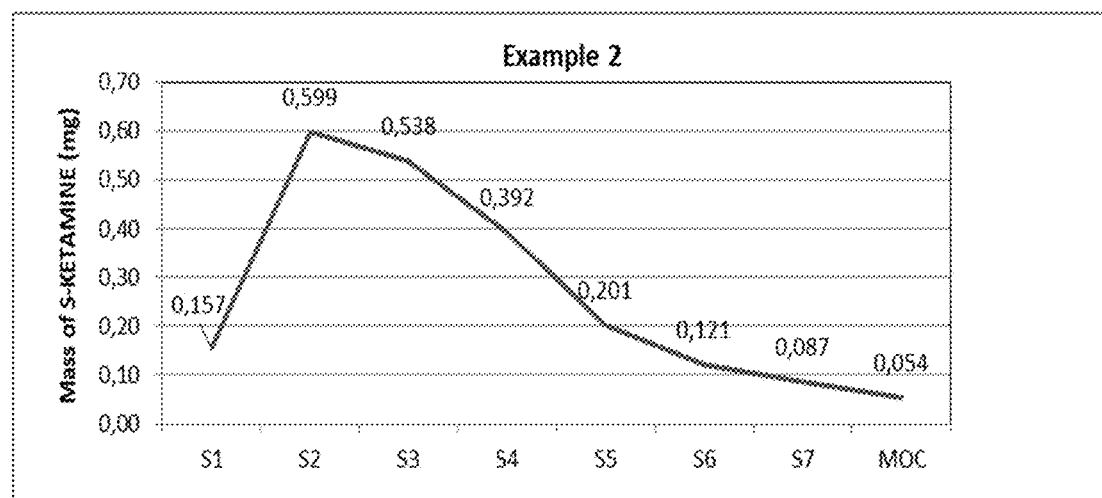
Figure 3:
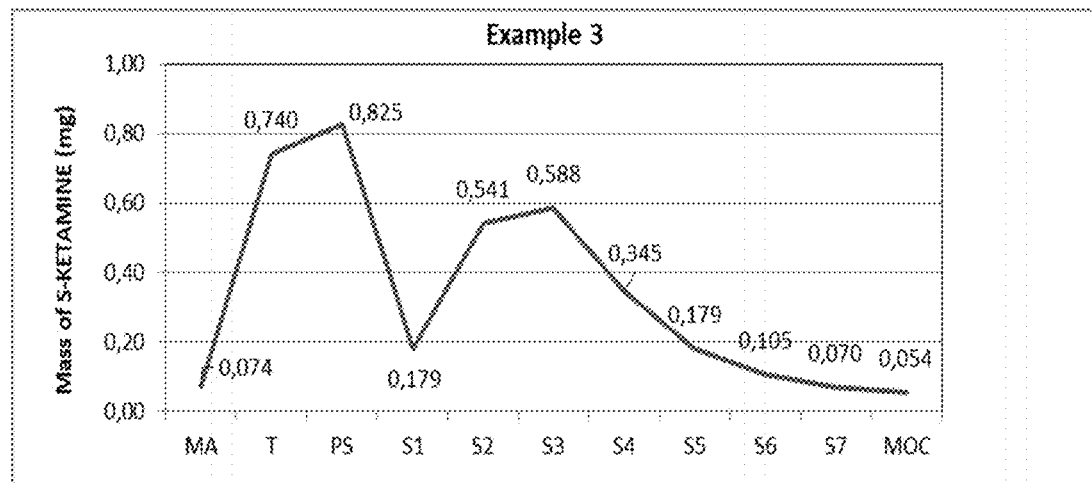
Figure 3:
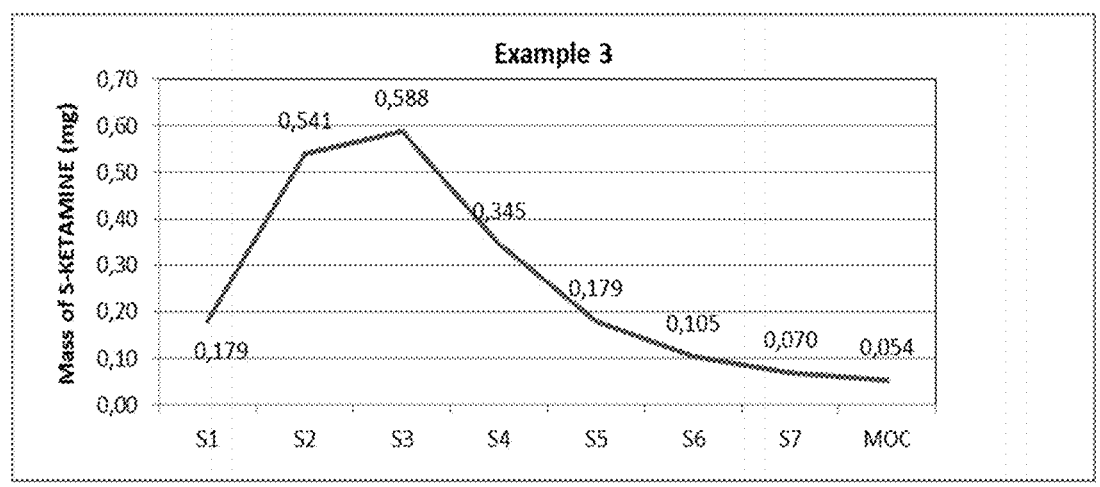
Figure 4:
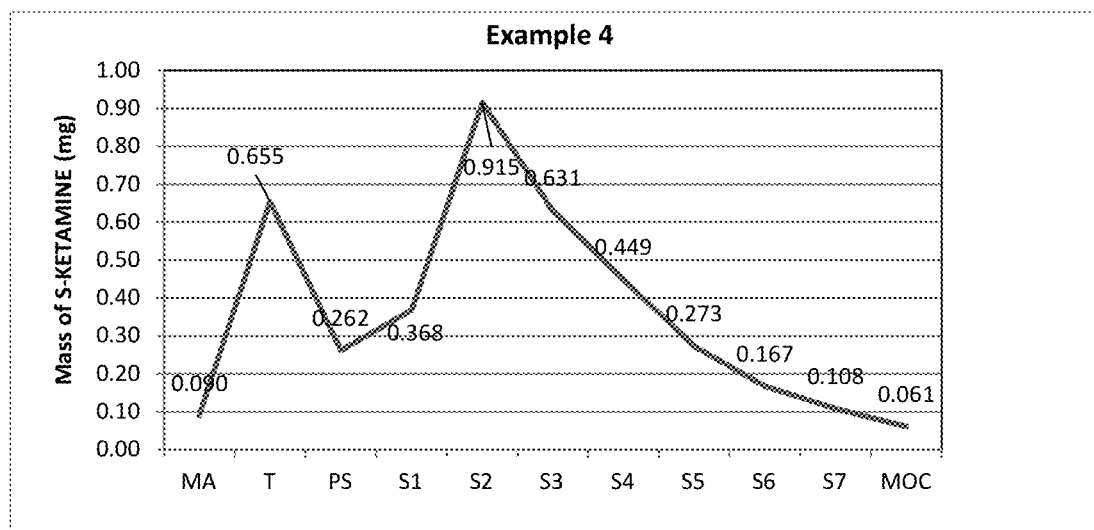
Figure 4:
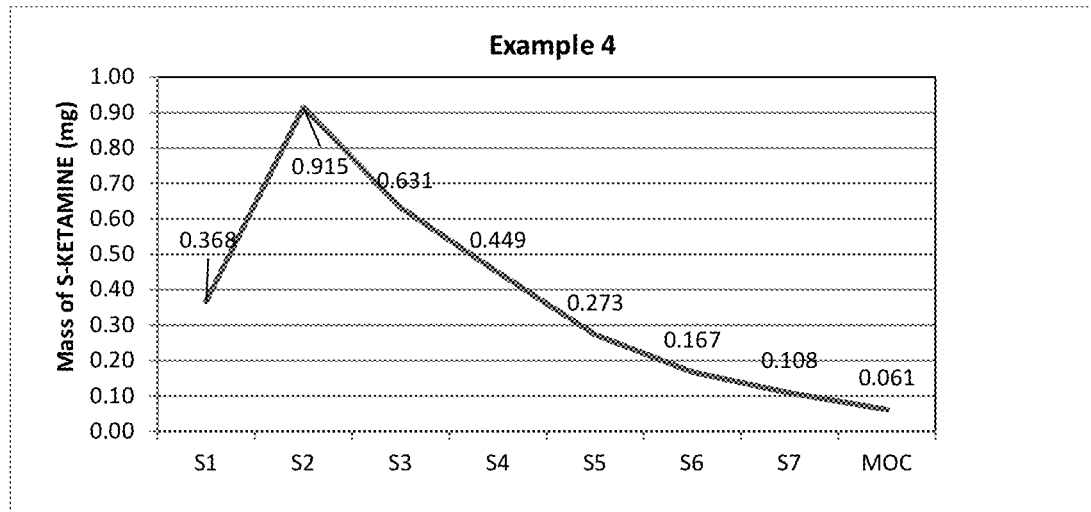

The results of the tests are presented in Table 1 below and in FIG. 1 (Example 1), FIG. 2 (Example 2) and FIG. 3 (Example 3) of the drawing, wherein upper diagrams present APSD data for the whole NGI and bottom diagrams present APSD data for stages 1-7 and MOC. The following abbreviations are used for the results of the tests:

MA—mouth adapter
T—induction port
PS—Pre-separator
S1-S7—stages of NGI
MOC—micro-orifice collector
ISM—Impactor sized mass; mass entering the impactor excluding non-sizing portions
MMAD (μm)—mass median aerodynamic diameter. Defined as the diameter at which 50% of the particles by mass are larger and 50% are smaller.
GSD—geometric standard deviation. Measure of the spread of an aerodynamic particle size distribution
FPF—fine particle fraction (%)
FPD—fine particle dose

TABLE 1

NGI deposition data

| | Example No | | |
|---|---|---|---|
| | 1 | 2 | 3 |
| MA [mg] | 0.043 | 0.194 | 0.074 |
| T | 0.166 | 0.713 | 0.740 |
| PS | 0.598 | 0.262 | 0.825 |
| S1 | 0.063 | 0.157 | 0.179 |
| S2 | 0.193 | 0.599 | 0.541 |
| S3 | 0.308 | 0.538 | 0.588 |
| S4 | 0.243 | 0.392 | 0.345 |
| S5 | 0.112 | 0.201 | 0.179 |
| S6 | 0.061 | 0.121 | 0.105 |
| S7 | 0.048 | 0.087 | 0.070 |
| MOC | 0.037 | 0.054 | 0.054 |
| ISM (mg) | 1.00 | 1.99 | 1.88 |
| Total Mass on Impactor (mg) | 1.07 | 2.15 | 2.06 |
| Total Mass on System (mg) | 1.87 | 3.32 | 3.70 |
| Mass on Impactor/Actuation (mg) | 1.07 | 2.15 | 2.06 |
| Mass on System/Actuation (mg) | 1.87 | 3.32 | 3.70 |
| FPD ≤ 5.0 mcm (mg) esketamine | 1.0 | 1.7 | 1.6 |
| FPF ≤ 5.0 mcm (%) | 49.0 | 51.0 | 44.0 |
| MMAD (mcm) | 2.6 | 2.9 | 3.0 |
| GSD | 1.8 | 1.8 | 1.8 |

The obtained results showed a product with expected quality attributes.

The composition of the invention demonstrated appropriate homogeneity and a very high level of fine particle fractions, with:

FPF>49%, FPD 1.0 mg; and emitted dose: 2.3 mg, for Example 1
FPF>47%, FPD: 1.7 mg; and emitted dose: 3.6 mg, for Example 2, and
FPF>44%, FPD: 1.6 mg; and emitted dose: 3.9 mg, for Example 3.

Esketamine Dry Inhalation Powder for Capsules

The following compositions has been prepared in accordance with the above general procedure in the scale of 0.9 kg.

Example 4

| Component | Amount (mg/unit) |
|---|---|
| Esketamine hydrochloride | 5.00 (corresponds to 4.34 mg esketamine) |
| Lactose monohydrate LH200 LP | 19.8 |
| Magnesium stearate | 0.2 |

Example 5

| Component | Amount (mg/unit) |
|---|---|
| Esketamine hydrochloride | 10.00 (corresponds to 8.67 mg esketamine) |
| Lactose monohydrate LH200 LP | 39.6 |
| Magnesium stearate | 0.4 |

Example 6

| Component | Amount (mg/unit) |
|---|---|
| Esketamine hydrochloride | 20.00 (corresponds to 17.34 mg esketamine) |
| Lactose monohydrate LH200 LP | 79.2 |
| Magnesium stearate | 0.8 |

Aerodynamic Particle Size Distribution (APSD) test of the compositions of Examples 4, 5 and 6 of the invention.

The compositions of Examples 4, 5 and 6 of the invention have been tested using the Next Generation Pharmaceutical Impactor (NGI) (Ph. Eur. Apparatus E) in accordance with the procedure for powder inhalers.

Figure 5:
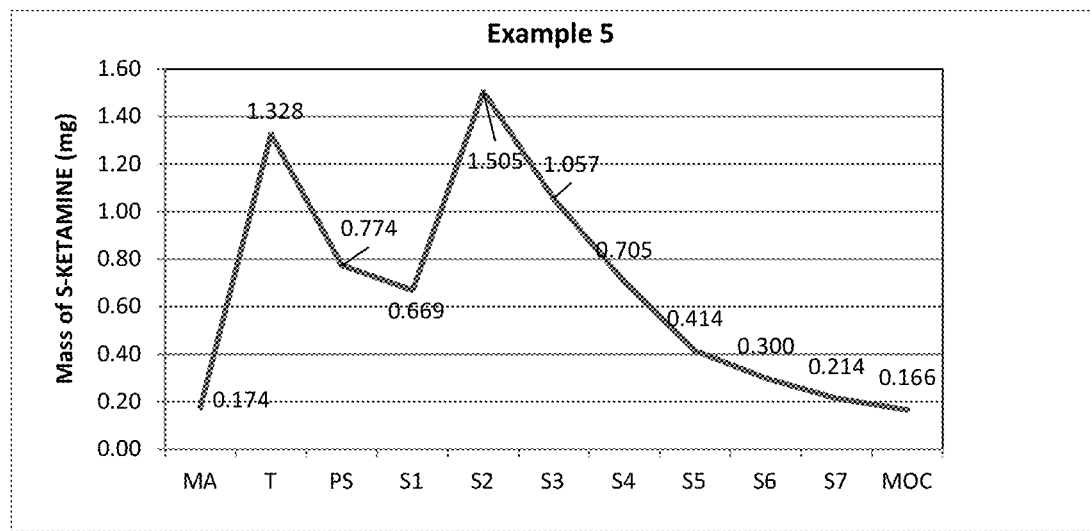
Figure 5:
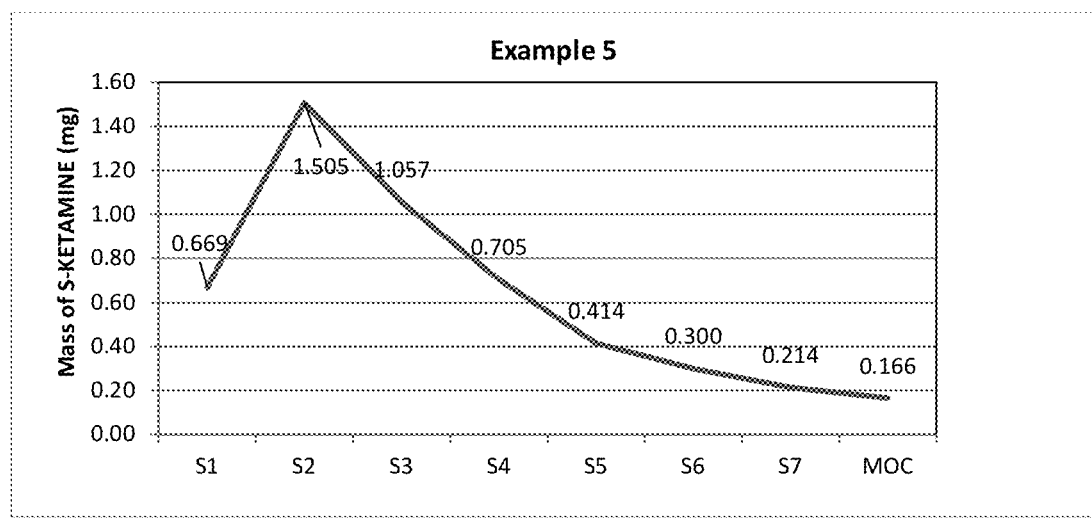
Figure 6:
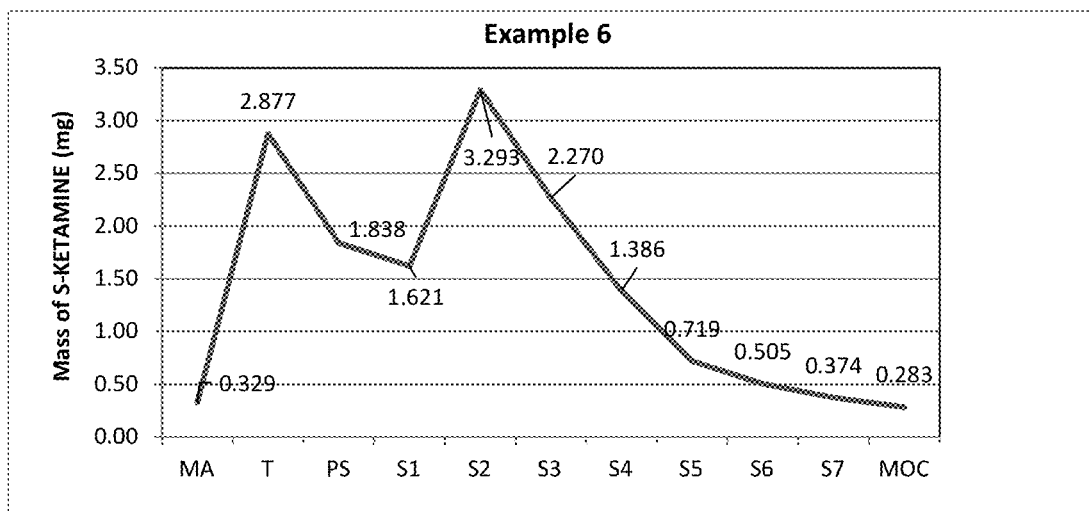
Figure 6:
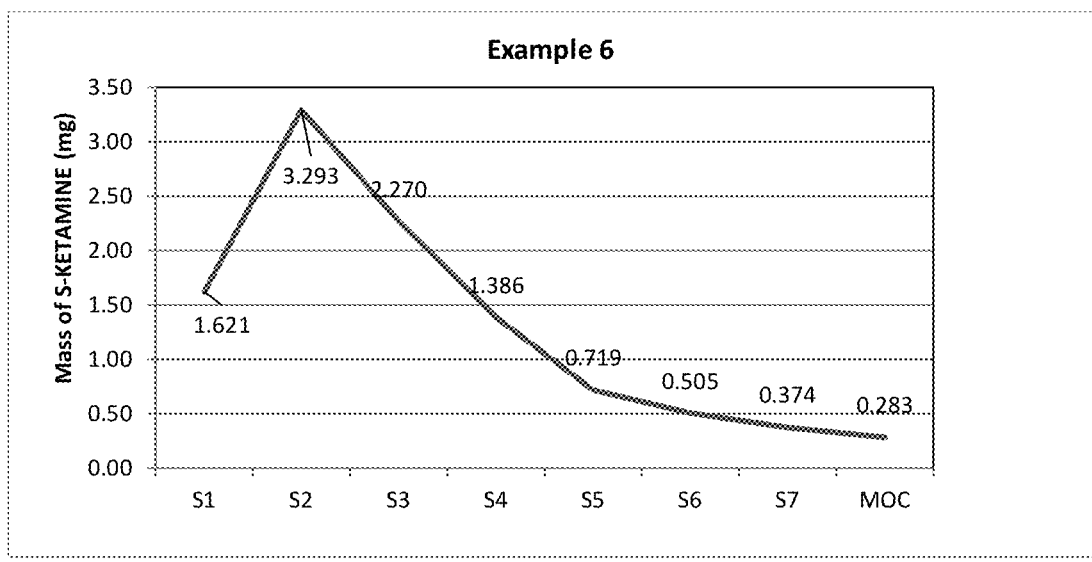

The results of the tests are presented in Table 2 below and in Figures (Example 4), FIG. 5 (Example 5) and FIG. 6 (Example 6) of the drawing, wherein higher diagrams present APSD data for the whole NGI and lower diagrams present APSD data stages 1-7 and MOC.

TABLE 2

NGI deposition data

| | Example No | | |
|---|---|---|---|
| | 4 | 5 | 6 |
| MA [mg] | 0.090 | 0.174 | 0.329 |
| T | 0.655 | 1.328 | 2.877 |
| PS | 0.262 | 0.774 | 1.838 |
| S1 | 0.368 | 0.669 | 1.621 |
| S2 | 0.915 | 1.505 | 3.293 |
| S3 | 0.631 | 1.057 | 2.270 |
| S4 | 0.449 | 0.705 | 1.386 |
| S5 | 0.273 | 0.414 | 0.719 |
| S6 | 0.167 | 0.300 | 0.505 |
| S7 | 0.108 | 0.214 | 0.374 |

TABLE 2-continued

NGI deposition data

|  | Example No | | |
|---|---|---|---|
|  | 4 | 5 | 6 |
| MOC | 0.061 | 0.166 | 0.283 |
| ISM (mg) | 2.61 | 4.36 | 8.83 |
| Total Mass on Impactor (mg) | 2.97 | 5.03 | 10.45 |
| Total Mass on System (mg) | 3.98 | 7.30 | 15.49 |
| Mass on Impactor/Actuation (mg) | 2.97 | 5.03 | 10.45 |
| Mass on System/Actuation (mg) | 3.98 | 7.30 | 15.49 |
| FPD ≤ 5.0 mcm (mg) esketamine | 2.4 | 3.9 | 7.9 |
| FPF ≤ 5.0 mcm (%) | 59 | 54 | 51 |
| MMAD (mcm) | 3.0 | 3.0 | 3.2 |
| GSD | 1.9 | 1.9 | 2.6 |

The obtained results showed a product with expected quality attributes.

The invented formulation demonstrated appropriate homogeneity and a very high level of fine particle fractions, with:
- FPF>59%, FPD 2.4 mg; emitted dose: 4.2 mg, for Example 4
- FPF>54%, FPD: 3.9 mg; emitted dose: 7.1 mg, for Example 5, and
- FPF>51%, FPD: 7.9 mg; emitted dose: 16.5 mg, for Example 6.

The dry powder pharmaceutical composition of the invention provided emitted esketamine hydrochloride dose at the level up to 97%, such as up to 85% of the nominal dose and at least 40% of fine particle fraction (fraction delivered to the lungs) for emitted esketamine dose.

Example 7

Pharmacokinetics of Inhaled Esketamine Dry Powder in Healthy Volunteers

Esketamine hydrochloride dry powder formulation of Example 2 was administered to healthy volunteers pulmonary, i.e. directly to the lungs using dry powder inhaler (DPI) (by self-administration).

One puff of dry powder formulation contained 4.6 mg of esketamine hydrochloride, corresponding to 4 mg of esketamine free base and excipients 18.22 mg of lactose monohydrate and 0.18 mg of magnesium stearate.

A single dose was an inhalation events consisting of 1 to 6 puffs, i.e. 4 to 24 mg of esketamine free base nominal dose.

In part A of the study, designed as a one-centre single ascending dose, the medicine was delivered in a single dose once daily (up to 6 consecutive puffs) to 18 healthy volunteer subjects. Subjects were divided into 6 cohorts, cohorts receiving 1, 2, 3, 4, 5 or 6 puffs in a single doses (inhalation events), respectively. Collection of blood samples for determination of esketamine and esnorketamine concentration and calculation of pharmacokinetic parameters was performed for up 24 hours following the start of the test.

The aim of the study was to determine the amount of puffs needed to obtain plasma concentration similar to that sufficient to achieve antidepressant effect as for 0.20 mg/kg 40 minutes intravenous infusion. It can be predicted on the basis of literature data that this corresponds to concentration at 40 min of infusion between about 60 to 100 ng/ml. It was also the aim to determine the number of puffs that allow to avoid a sharp peak of plasma concentration that is considered an important factor inducing adverse psychomimetic and dissociative effects.

Figure 7:
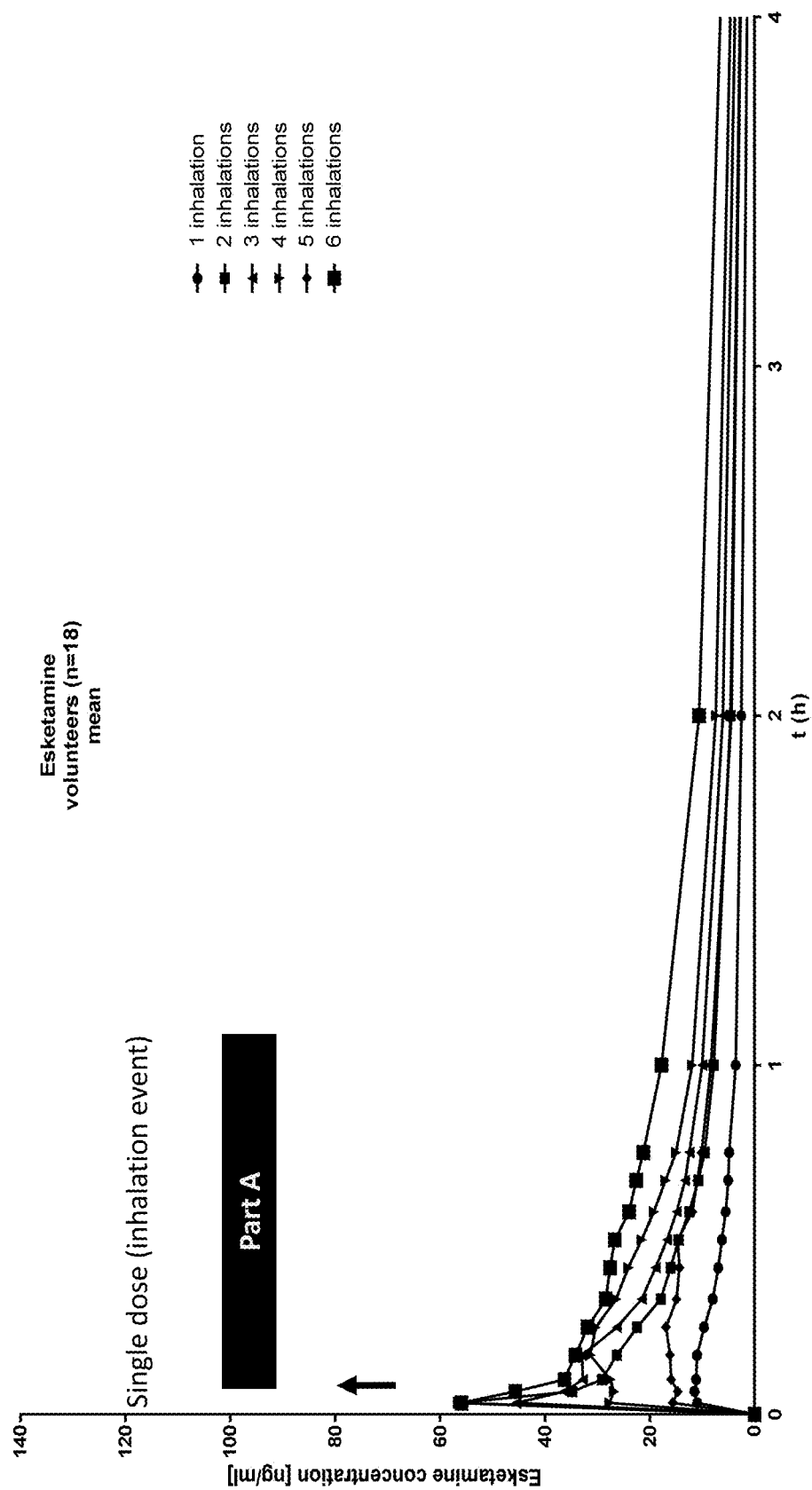
FIG. 7 shows esketamine plasma concentration vs time after administration of various single doses of dry powder composition of Example 2.

The results of the part A of the test are presented on FIG. 7 that shows esketamine plasma concentration over time after administration of various single doses of dry powder composition of Example 2. As it can be seen, the number of puffs that allows to obtain plasma esketamine concentration sufficient for antidepressant effect and without sharp peak of said concentration was determined to be 1 to 4 puffs, corresponding to 4 to 16 mg of esketamine free base nominal dose.

Therefore, a single dose (inhalation event) consisting of 1 to 4 puffs was selected for the next Part B of the test.

In part B of the study the composition of Example 2 was administered to 12 healthy volunteer subjects divided into 4 cohorts in four different single doses each cohort (i.e. each single dose consisting of 1, 2, 3 or 4 puffs, respectively) in one day in the administration sequence consisting of three administrations of single dose (inhalation event) in the period of 30 minutes, Between inhalation events there were 15 minutes break periods, i.e. first single dose was administered at 0 min., second single dose was administered at 15 min, and third single dose was administered at 30 min.

Figure 8:
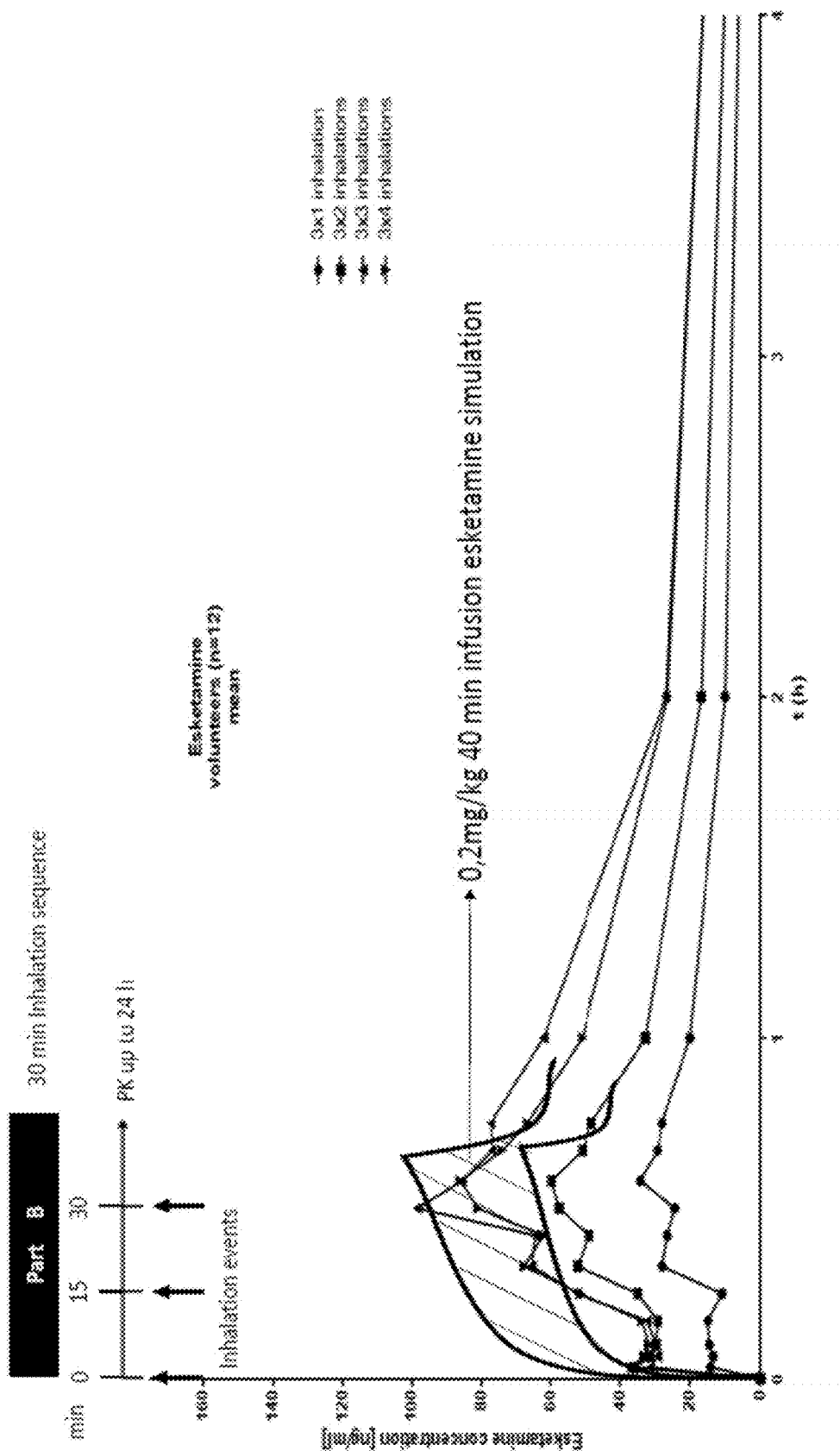
FIG. 8 shows esketamine plasma concentration vs time after administration of a sequence of single doses of dry powder composition of Example 2.

The aim of Part B was to investigate pharmacokinetic properties of esketamine following different dosing schemes in healthy subjects and determine the scheme that enables achievement of the appropriate plasma concentration over time to mimic the 40-minute intravenous infusion (part B), The results of the of the part B of the test are presented on FIG. 8 that shows esketamine plasma concentration over time after administration of various single doses of dry powder composition of Example 2 in a sequence of 3 administrations of single doses during 30 minutes. FIG. 8 shows also (the area between two bold black lines) a simulation of esketamine plasma concentration after 0.2 mg/kg 40 minutes i.v. infusion.

As it can be seen form FIG. 8, sequence of administration of 3 single doses consisting of 3 or 4 puffs allowed to obtain plasma concentration profile mimicking quite well esketamine intravenous infusion at the level corresponding to antidepressant effect.

Both in Part A and Part B of the study the adverse effects were monitored and assessed by a psychiatrist. The summary of the adverse effects is presented in FIG. 9. As can be seen, no serious effects were observed, all adverse effects being assessed as mild, occasionally moderate. Psychomimetic effects were transient, lasting up to 30 minutes following administration. There were no discontinuations due to adverse effects or toxicity.

The above shows that pulmonary administration of esketamine, i.e. directly to the lungs is a promising way of treating depression, in particular TRD, by convenient self-administration by a patient. Plasma concentration profile is quite smooth, consistent with a target profile and safe for chronic administration.

The invention claimed is:

1. An oral inhaler comprising:
   a dry powder composition comprising:
      a nominal unit dose of esketamine, or a pharmaceutically acceptable salt thereof, wherein the nominal unit dose is 4 mg, calculated as free base;
      30-95% by weight of lactose monohydrate; and
      0.2-3% by weight of magnesium stearate;
      wherein the esketamine, or a pharmaceutically acceptable salt thereof has a median particle diameter d50 of 1-10 μm, as measured by laser diffraction.

2. The oral inhaler of claim 1, wherein the esketamine, or pharmaceutically acceptable salt thereof, is esketamine hydrochloride.

3. The oral inhaler of claim 1, wherein the dry powder composition is disposed within a blister cavity.

4. The oral inhaler of claim 1, wherein the dry powder composition comprises from about 10% to about 35% by weight esketamine or the pharmaceutically acceptable salt thereof.

5. The oral inhaler of claim 1, wherein the dry powder composition comprises from about 15% to about 30% by weight esketamine or the pharmaceutically acceptable salt thereof.

6. The oral inhaler of claim 5, wherein the dry powder composition comprises about 17%, about 20%, about 25%, or about 29% by weight esketamine or the pharmaceutically acceptable salt thereof.

7. The oral inhaler of claim 6, wherein the nominal unit dose of esketamine, or pharmaceutically acceptable salt thereof, is 4.6 mg of esketamine hydrochloride, wherein the dry powder comprises about 20% by weight esketamine hydrochloride.

8. The oral inhaler of claim 1, wherein the esketamine, or pharmaceutically acceptable salt thereof, is esketamine hydrochloride, wherein the dry powder comprises about 1.6% by weight magnesium stearate.

9. An oral inhaler comprising:
   a dry powder composition comprising:
      a nominal unit dose of 4.6 mg of esketamine hydrochloride, wherein the dry powder comprises about 20% by weight esketamine hydrochloride;
      about 30-79.8% by weight of lactose monohydrate; and
      0.2-3% by weight of magnesium stearate; and
   wherein the esketamine hydrochloride has a median particle diameter d50 of 1-10 μm, as measured by laser diffraction.

10. The oral inhaler of claim 9, wherein the dry powder composition is disposed within a blister cavity.

11. The oral inhaler of claim 9, wherein the dry powder comprises about 1.6% by weight magnesium stearate.

* * * * *